UNITED STATES PATENT OFFICE.

HOWARD C. KEARNEY AND JOSEPH W. HARRISON, OF PHILADELPHIA, PENNSYLVANIA.

IMPROVED COMPOSITION FOR REMOVING PAINT, VARNISH, &c.

Specification forming part of Letters Patent No. 42,295, dated April 12, 1864.

*To all whom it may concern:*

Be it known that we, HOWARD C. KEARNEY and JOSEPH WILMER HARRISON, both of Philadelphia, Pennsylvania, have invented a new Composition for Removing Paint, Varnish, &c., which composition we term a "resolvent;" and we do hereby declare the following to be a full, clear, and exact description of the same.

In order to remove old paint, varnish, &c., from wood-work and other surfaces, it has hitherto been the practice to hold near the surface of the paint heated irons or portable grates carrying ignited fuel, the effect of which is to blister the paint, which can be removed by subsequent scraping. This process is expensive, as it requires much tedious manipulation and takes considerable time to execute.

Our invention has been designed with the view of readily removing old paint, varnish, &c., by the application thereto of a composition, which is fully described hereinafter, and which dissolves, loosens, and so changes the character of the paint that it can be removed without trouble.

In order to enable others to make and apply our invention, we will now proceed to describe the manner of compounding and using the same.

We dissolve in one gallon of boiling water about two pounds of sal-soda, carbonate of soda, or carbonate of potassa, or other equivalent alkalies, and while boiling we add hydrate of lime in sufficient quantities to insure the conversion of the solution into a caustic alkali. We then mix this solution with freshly-prepared hydrate of lime until it reaches the consistency of a paste.

A coating of the compound thus prepared is applied to the surface of the paint by a strong brush or by a trowel, and is permitted to remain for a sufficient length of time to permit the caustic alkali to unite with the oily matter of the paint or varnish and to convert the same into a soapy compound. On removing the coating of composition it will be found that the character of the paint or varnish is entirely changed and so far loosened from the wood, stone, or other material to which it has been applied that it can be peeled off with the composition, whatever remains being washed off with the greatest facility. After the surface from which the paint has been removed is washed with water a weak solution of sulphuric or other acid may be applied, so as to neutralize whatever caustic alkali may remain adhering to the wood. The surface should then be subjected to another washing with water, and then dried, after which it will be ready to receive a new coat of paint.

The length of time required for the composition to render the paint capable of being readily removed depends upon the age of the paint and the number of coats. We have removed the paint and varnish of coach-bodies which have been applied for years in the short space of forty minutes, although the composition will require to remain in contact with very old paint or varnish for upward of one hour before it is ready for removal.

It is not necessary in all cases to make the composition of the consistency of a paste or mortar. When applied to horizontal surfaces it may be in a fluid or semi-fluid state, as it can have no tendency to flow from the surface; but when applied to vertical or inclined surfaces it should be so thick that it will adhere without any tendency to flow down the surfaces.

The lime, independently of serving as a vehicle for transferring the alkali to the painted surface, acts as a preservative of the alkali.

We claim as our invention and desire to secure by Letters Patent—

The use, substantially in the manner and for the purpose herein described, of a solution of sal-soda, potassa, or other equivalent alkali, in combination with hydrate or carbonate of lime.

In testimony whereof we have signed our names to this specification in the presence of two subscribing witnesses.

HOWARD C. KEARNEY.
JOSEPH WILMER HARRISON.

Witnesses:
JOHN WHITE,
CHARLES HOWSON.